United States Patent [19]

Sveda

[11] 4,204,196

[45] May 20, 1980

[54] MODULAR ELECTRONIC TIMER

[76] Inventor: Michael P. Sveda, 25 Fallen Oaks Dr., Thousand Oaks, Calif. 91360

[21] Appl. No.: 961,492

[22] Filed: Nov. 17, 1978

[51] Int. Cl.² .......................................... H01H 43/00
[52] U.S. Cl. .............................. 340/309.4; 340/309.1
[58] Field of Search .......................... 340/309.4, 309.1; 307/141

[56] References Cited

U.S. PATENT DOCUMENTS 3,903,515  9/1975  Haydon .............................. 340/309.1

*Primary Examiner*—Harold I. Pitts
*Attorney, Agent, or Firm*—Christie, Parker & Hale

[57] ABSTRACT

An electronic timer is provided of the type used for producing command signals to initiate and discontinue the operation of external devices such as pool pumps, lights, and the like. The timer is organized to adapt it to a modular arrangement whereby modules are easily added to increase the number of different command signals provided. The timer includes a common bus to which there are applied a plurality of parallel pulse signals that in combination define a timing interval divided into a sequence of time slots. A plurality of independently operable decoders are connected to the common bus so that all the decoders continuously monitor the parallel pulse signals. Preferably, the plurality of parallel pulse signals are generated in a control center module and applied to the common bus which propagates them to one or more other modules each of which contains at least a pair of the independently operable decoders. Each such decoder includes gating circuitry operable to produce a command signal and further includes a manually adjustable input for completing a plurality of signal flow paths from the common bus to the gating circuitry to cause the gating circuitry to produce the output command signal during a selected one of the time slots.

10 Claims, 14 Drawing Figures

Fig. 4

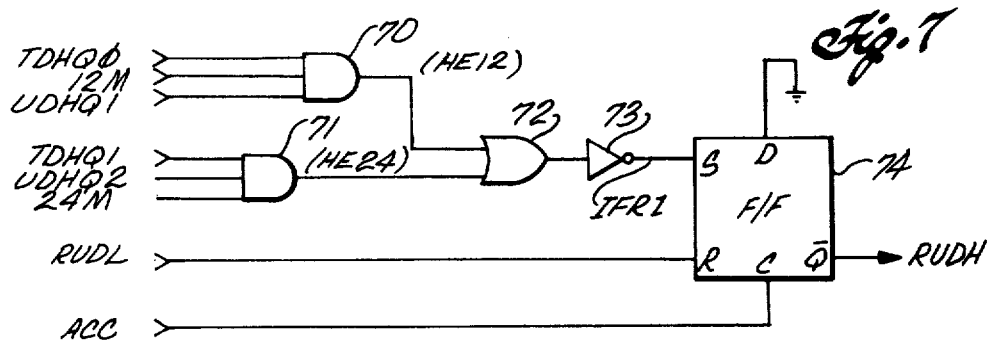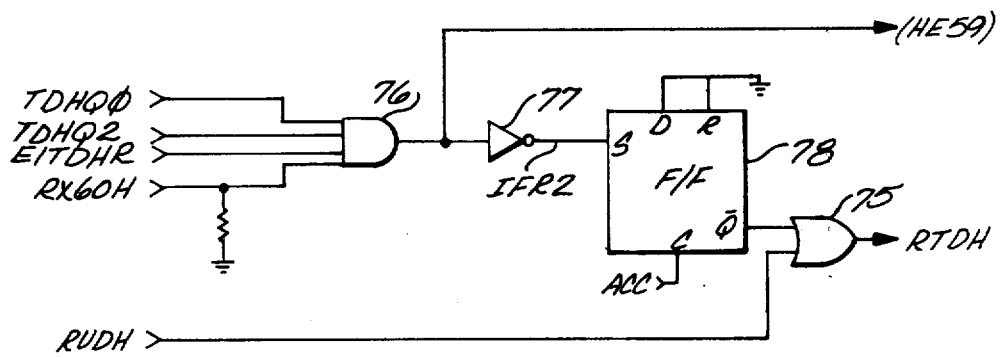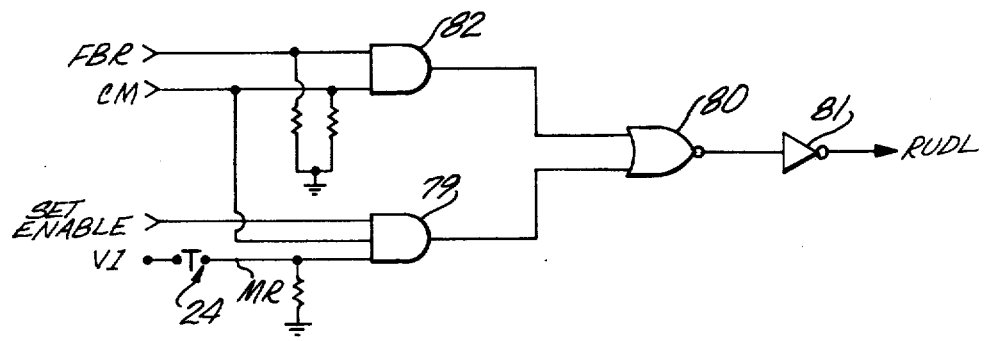
Fig. 7

Fig. 12

MODULAR ELECTRONIC TIMER

BACKGROUND OF THE INVENTION

In general, this invention relates to electronic timers of the type that produce command signals to program the turning on and off of external devices. More particularly, it relates to an electronic timer that is so organized as to adapt it for a modular arrangement.

Various types of timers have heretofore been developed to provide for programming switching operations. Some such timers are electromechanical in nature and include a bulky motor-driven disk that rotates to cause peripheral switches to open and close at selected angular orientations of the disk. Other such timers are electronic in nature.

A well known approach to organizing such an electronic timer involves an electronic store, the stored value of which is compared with the current value defined by an electronic digital clock. To provide a separate comparator circuit for each different switching function involves a substantial amount of circuitry in circumstances in which a multiplicity of switching functions are to be programmed.

In view of the foregoing disadvantage, it has heretofore been proposed to provide a multiplexer that controls a sampling operation whereby seriatum comparison operations are carried out by a time-shared comparator circuit.

As for the multiplexing approach, it should be noted that a disadvantage inheres in this approach with respect to the precision with which start and stop times can be defined in a system for producing a plurality of command signals. In particular, with a single comparator being time shared by a plurality of stores, it is not possible to provide for simultaneously initiating a plurality of command signals. Thus, in circumstances in which for example it is desired to simultaneously start one device and stop another device, this can not be achieved by the multiplexed timer itself. Instead, one command signal must precede the other.

SUMMARY OF THE INVENTION

The present invention departs from the above-described prior art approach involving one or more comparator circuits that compare the value defined by a digital clock and the value stored in an electronic store. Owing to the organization of the present invention, an advantage arises with respect to the capability of providing simultaneous command signals so that, for example, one external device can be turned on at the same instant another external device is turned off.

Structurally, the present invention comprises a common bus. Circuit means are provided for generating and applying to the common bus a plurality of pulse signals that in combination define a timing interval divided into a sequence of time slots. In a preferred embodiment of a timer according to the invention, several modes of operation are selectable including a mode in which the pulse signals are cyclical.

The present invention further includes a plurality of decoders that, significantly, are independently operable. The decoders are connected to the common bus so that all the decoders continuously monitor the parallel pulse signals. Each of the independently operable decoders includes gating means operable to produce an output command signal, and manually adjustable means for completing signal flow paths from the common bus to the gating means to cause the gating means to produce the output command signal during a selected one of the time slots.

The foregoing and other advantageous features of the present invention are explained more fully below and set forth in the appended claims.

BRIEF DESCRIPTION OF THE DRAWINGS

FIGS. 3-11 are each a block and schematic diagram of circuitry incorporated into a control center module of the modular electronic timer, wherein FIG. 3 depicts circuitry serving as a multi-frequency source of timing pulses;

FIG. 4 depicts switching circuitry that supplies a selected frequency clocking signal;

FIG. 5 depicts an accumulator counter comprising a plurality of sub-registers;

FIGS. 6 and 7 depict various portions of sequencing control circuitry for the accumulator counter;

FIG. 8 depicts circuitry that supplies a skip digit signal;

FIG. 9 depicts circuitry that cooperates with the circuitry of FIG. 8;

FIG. 10 depicts a common bus and circuitry of the control center module that is connected thereto;

FIG. 11 depicts display circuitry of the control center module;

FIG. 12 is a timing diagram illustrating a representative example of operation;

DETAILED DESCRIPTION

Figure 1:
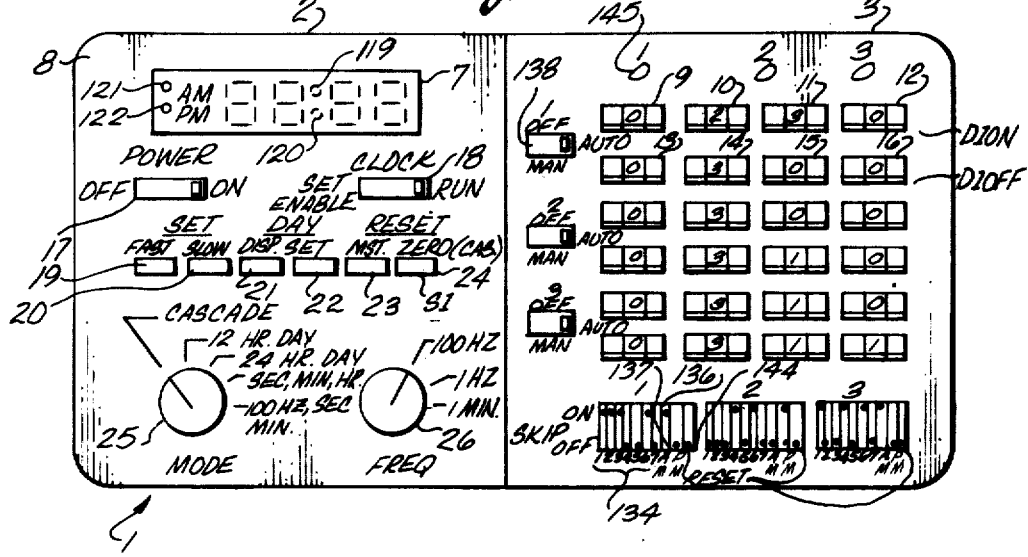
FIG. 1 is a front elevation view of a modular electronic timer embodying the invention.
Figure 2:
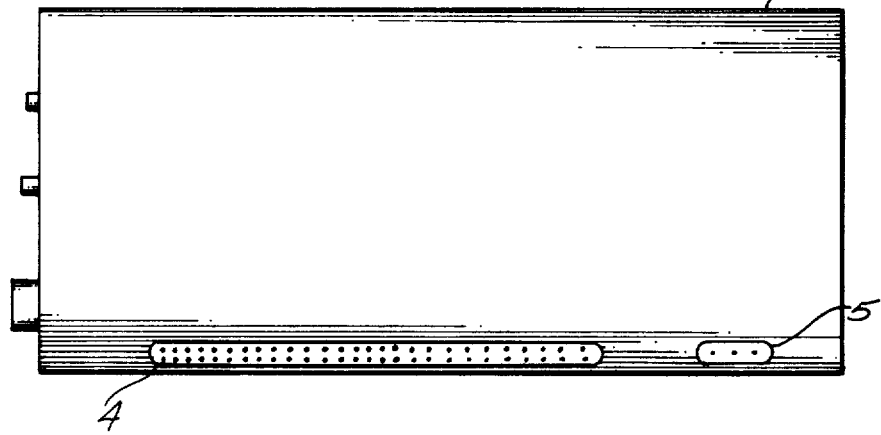
FIG. 2 is a side elevation view of the modular electronic timer.

With reference to FIGS. 1 and 2, a modular electronic timer 1, embodying presently preferred features of this invention, comprises a control center module 2 and at least one decoder module 3. As is fully explained below, circuitry within modular electronic timer 1 is organized such that additional decoder modules can be added. To this end, a connector 4 and a connector 5 are provided on a side panel 6 of decoder module 3. Each module 3 that is connected in side-by-side relationship via such connectors 4 and 5 receives, via connector 4, a plurality of parallel pulse signals, operating power, and ground requirements carried by a common bus extending through the modules. Connector 5 provides AC output power for operating external devices. As to the matter of operating power, control center module 2 includes a conventional d.c. power supply (not shown) comprising rectifying, filtering, and regulating circuitry of conventional design.

Modular electronic timer 1 is capable of performing a wide range of functions, and a detailed description of most of these various functions is best deferred until after basic features of the circuitry within modular electronic timer 1 are described. At this point, however, it is appropriate to describe an introductory example to illustrate one of the ways in which modular electronic timer 1 can be used. Accordingly, there will now be described, for circumstances in which a homeowner wants to have a pool pump turn on at 8:00 a.m. and turn off at 2:00 p.m., a timing function performed by modular electronic timer 1.

Figure 10:
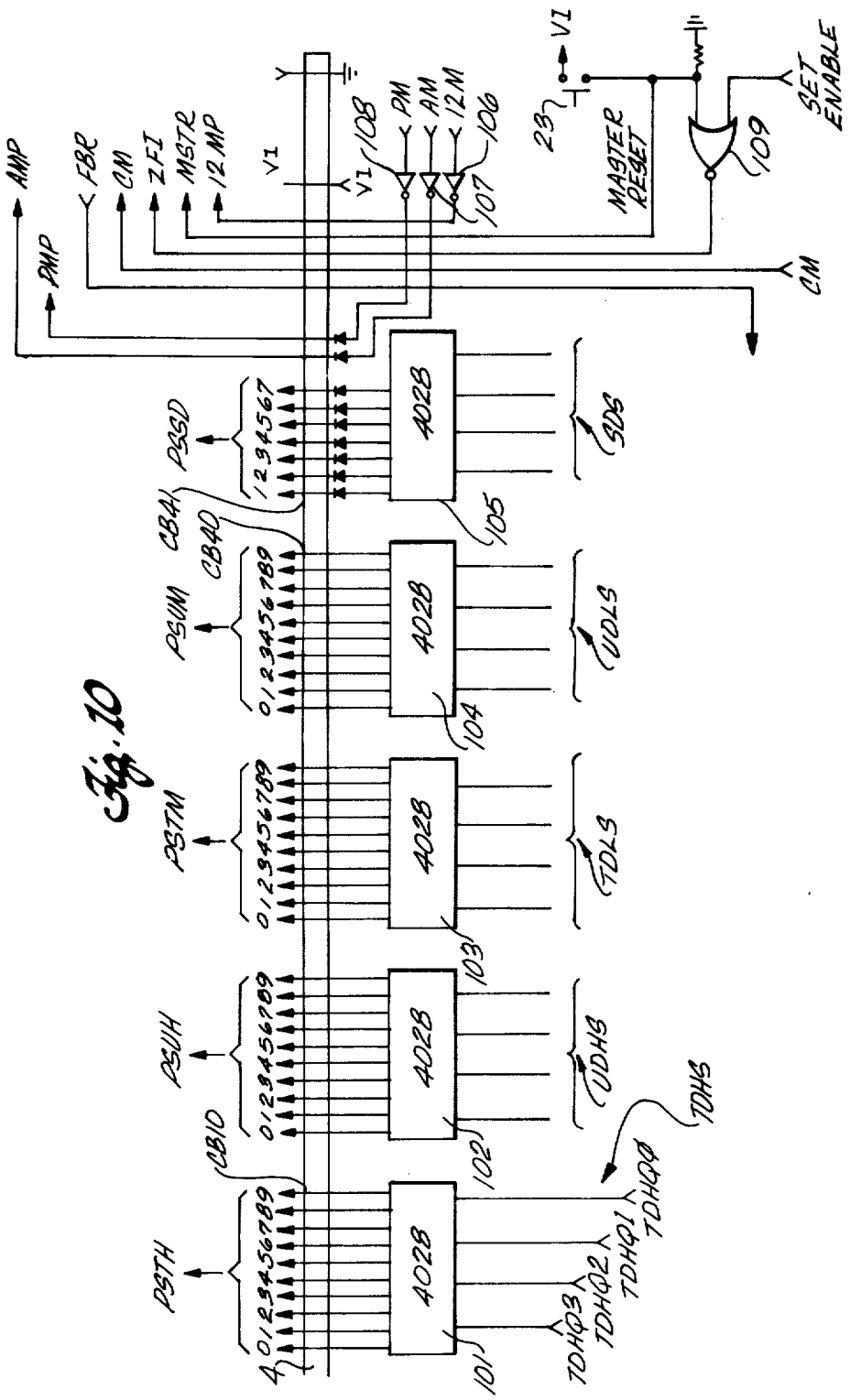

When used to program the turning on and off of the pool pump in accordance with this schedule, control center module 2 is appropriately operated in a mode referred to herein as a 24-hour cycle mode. In this mode, an accumulator counter (FIG. 5) is incremented at a one pulse per minute (ppm) rate and the accumulator counter cyclically returns to the same state every 24 hours. Signals provided by the accumulator counter are used to control a display 7 on a front panel 8 of control center module 2. Separately, state decoding circuitry shown in FIG. 10 is responsive to the accumulator counter to generate and apply to the common bus a plurality of parallel pulse signals that in combination define a timing interval divided into a sequence of time slots. In this mode, the time interval is a 24-hour period and the time slots are each one minute in duration.

Module 3 has within it a plurality of independently operable decoders, each of which continuously monitors the parallel pulse signals. A first one of the independently operable decoders includes a bank (D1ON) of rotary switches 9, 10, 11 and 12 of the 10-position thumbwheel type. In this example, the homeowner adjusts these four thumbwheel switches as follows. Switch 9 is rotated to position 0, switch 10 to position 8, switch 11 to position 0, and switch 12 to position 0. In general, the positioning of the thumbwheel switches define what is referred to herein as a "pickoff point." In this example, the pickoff point defined by bank D1ON is 0800.

A second one of the independently operable decoders includes a bank (D1OFF) of such thumbwheel switches 13, 14, 15, and 16. In this example, the homeowner adjusts these four thumbwheel switches as follows. Switch 13 is rotated to position 1, switch 14 to position 4, switch 15 to position 0, and switch 16 to position 0. The foregoing is such as to define the pickoff point 1400 hours, this being the same as 2:00 p.m. In operation, whenever the accumulator counter reaches the state corresponding to 8:00 a.m., the first independently operable decoder produces an output command signal that provides for turning on the pool pump, and whenever the accumulator counter reaches the state corresponding to 2:00 p.m., the second independently operable decoder produces an output command signal that provides for turning off the pool pump.

Figure 8:
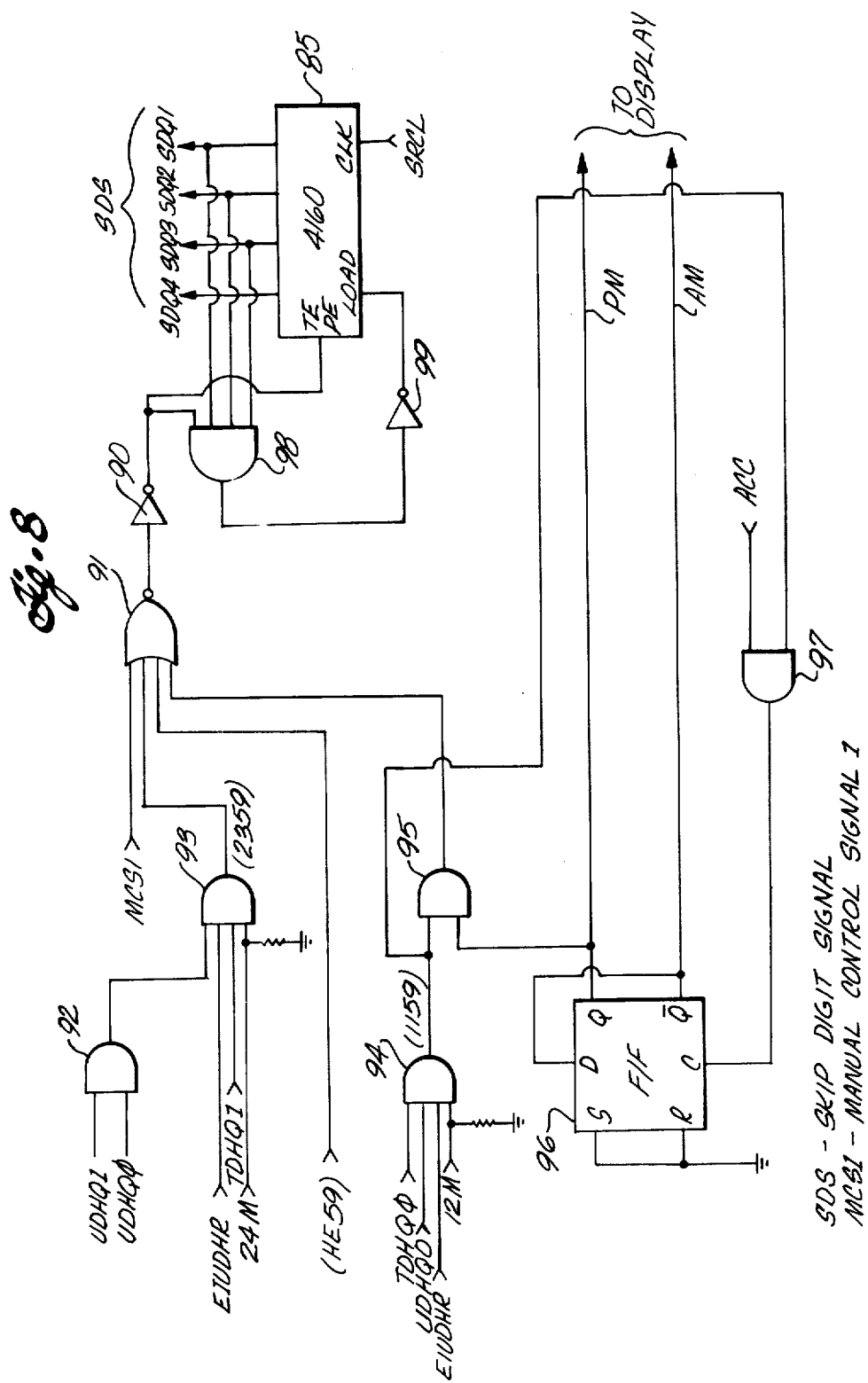

With reference again to FIG. 1, there is also provided on front panel 8 a plurality of manually controllable switches that will now be described. A switch 17 is provided so that the d.c. output (V1) of the above-mentioned power supply can be connected to and disconnected from digital circuitry within the modules of modular electronic timer 1. A two-position switch 18 is placed in a Set Enable position in circumstances in which the user is setting the accumulator counter to a desired state, and is placed in a Run position in circumstances in which the accumulator counter is to be automatically incremented. Switches 19 and 20 are each a pushbutton switch that the user depresses while the accumulator counter is being set to a desired state. While switch 19 is being depressed, the accumulator counter increments from state to state at a higher rate than it does while switch 20 is being depressed. Display 7 is normally responsive to the accumulator counter so that the time of day can be displayed. It is sometimes desirable to display a number corresponding to the day of the week, and a signal therefor is available from a register shown in FIG. 8. To this end, there is provided a pushbutton switch 21. A switch 22 is a pushbutton switch that is depressed in circumstances in which the above-mentioned register of FIG. 8 is being preset. Switches 23 and 24 are each a pushbutton switch used for resetting operations described fully below. A rotary switch 25 is a mode control switch having four poles each having five positions so that modular electronic timer 1 can be manually adjusted to operate in any selected one of five modes. The five modes are referred to herein as cascade, twelve-hour cycle, twenty-four hour cycle, hour interval, and minute interval. A rotary switch 26 is provided so that the user can select among three different frequencies for controlling the rate of incrementing of the accumulator counter.

Figure 3:
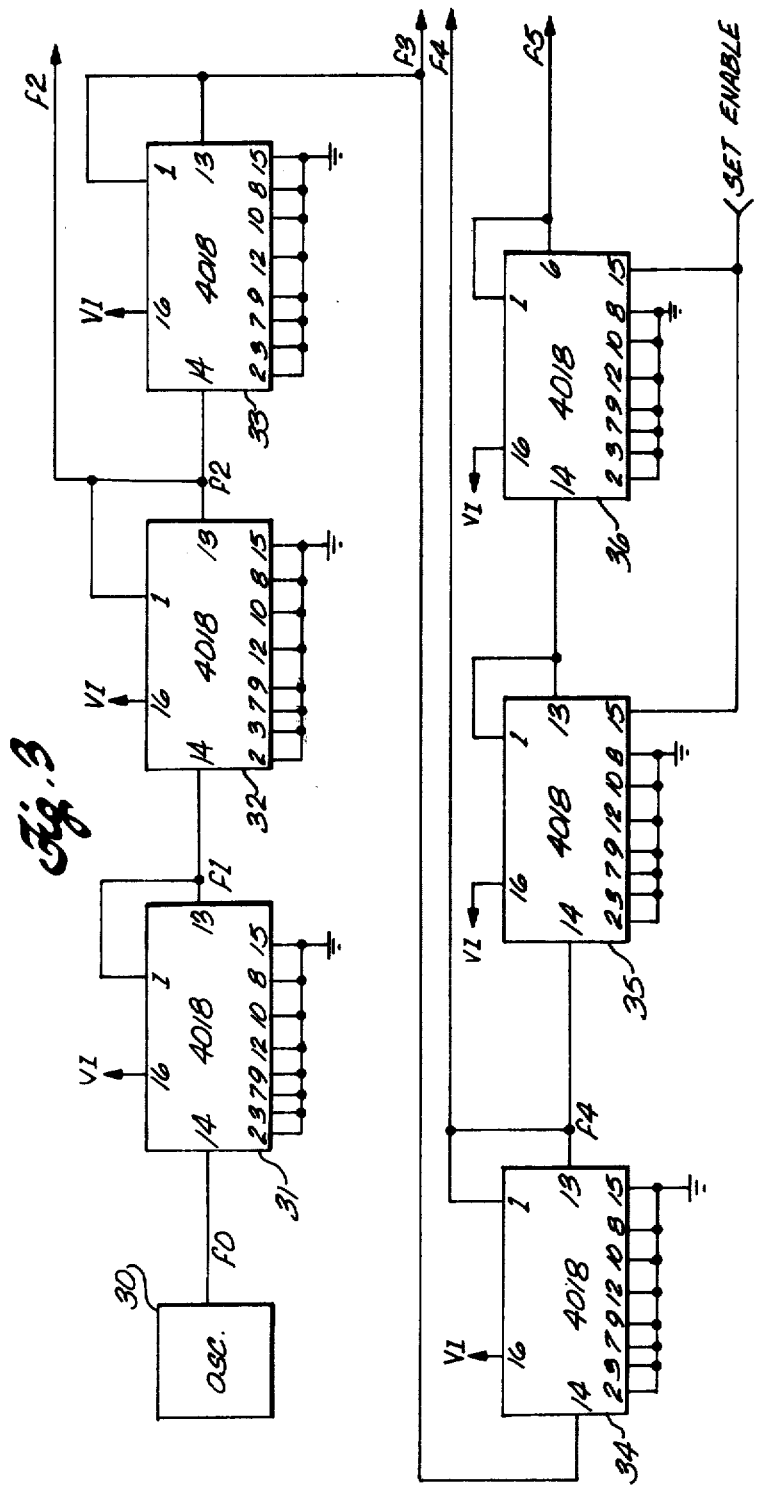

With reference to FIG. 3, there will now be described circuitry within control center module 2 that serves as a multi-frequency source of timing pulses. A conventional oscillator 30 preferably of the crystal controlled type, generates a square wave signal f0. In the illustrated embodiment, f0 has a frequency of 10 KHz.

A divide-by-10 counter 31 is clocked by f0 and produces a signal f1 which is a square wave having a frequency of 1 KHz. A suitable integrated circuit for use as such counter is A CMOS 4018B series, presettable divide-by-N counter. A number of companies manufacture such an integrated circuit in accordance with an industry standard as to pin numbers. FIG. 3 shows such pin numbers and use connections made to the pins of counter 31 to obtain a divide-by-10 counter.

Another divide-by-10 counter 32 receives f1 as a clocking signal and produces a signal f2 which is a square wave having a frequency of 100 Hz. Another divide-by-10 counter 33 receives f2 as a clocking signal and produces a signal f3 which is a square wave having a frequency of 10 Hz. Another divide-by-ten counter 34 receives f3 as a clocking signal and produces a signal f4 which is a square wave having a frequency of 1 Hz. Another divide-by-10 counter 35 receives f4 as a clocking signal and produces a signal that is applied as a clocking signal to a divide-by-6 counter 36. Suitably, divide-by-6 counter 36 is also a CMOS 4018B series, presettable divide-by-N counter, the pins of which are connected as shown. The output signal of divide-by-6 counter 36 is a signal f5 which has a frequency of 1 ppm. Counters 35 and 36 are connected to receive a SET ENABLE signal which provides for resetting these counters in the course of certain operations described below with reference to other figures.

Figure 4:
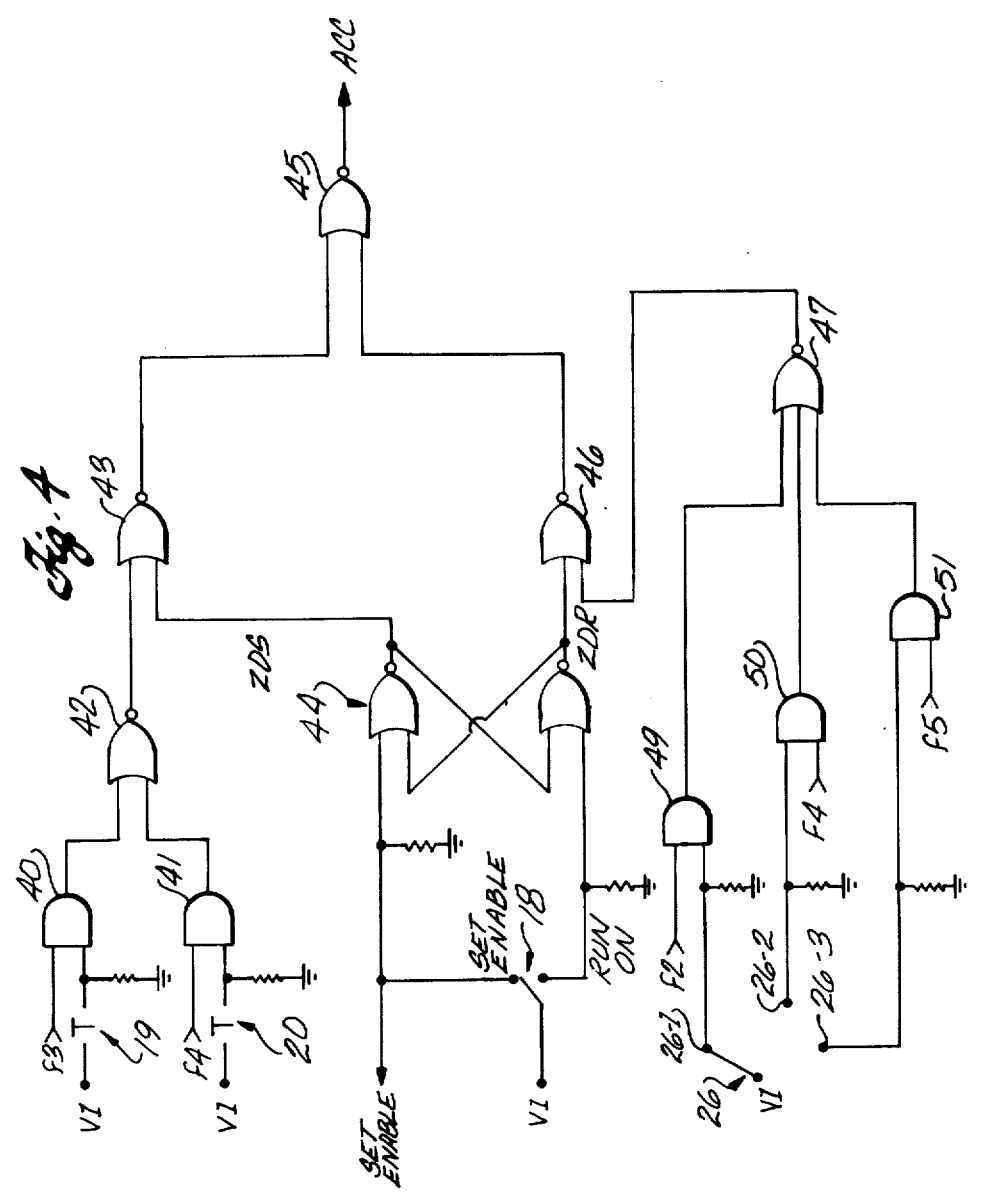

In FIG. 4 there is shown circuitry that produces an ACC (an achronym for accumulator clock) signal. A two-input AND gate 40 has one of its inputs connected to receive the f3 signal and has its other input connected to switch 19. Unless switch 19 is depressed, the output signal produced by AND gate 40 is "false," i.e., it remains at the 0 level. During the time that switch 19 is closed, thereby connecting one of the inputs of AND gate 40 to V1 (preferably +12 volts), the output signal of AND gate 40 is a copy of the f3 signal. That is, it is a 10 Hz square wave having essentially the same phase as the f3 signal.

A two-input AND gate 41 has one of its inputs connected to receive the f4 signal and has its other input connected to switch 20. While switch 20 is closed, the output signal provided by AND gate 41 is a copy of the f4 signal, otherwise it remains at the 0 level. A NOR gate 42 is connected to receive the output signals of AND gates 40 and 41. Its output signal continuously remains at the 1 level so long as neither switch 19 nor switch 20 is closed. While switch 19 is closed, the output signal of NOR gate 42 is the complement of the f3 signal. While switch 20 is closed, the output signal of NOR gate 42 is the complement of the f4 signal. A NOR gate 43 receives the output signal of NOR gate 42 and also receives a ZDS signal produced by a latch circuit generally indicated at 44. The ZDS signal is at the 0 level during the time that switch 18 is positioned as shown in FIG. 4. A NOR gate 45 has one of its inputs connected to the output of NOR gate 43 and produces the ACC signal.

The other input to NOR gate 45 is received from a NOR gate 46. NOR gate 46 receives a ZDR signal from latch circuit 44 and receives another signal from a NOR gate 47. So long as switch 18 is in the position depicted in FIG. 4, the ZDR signal is at the 1 level, thereby forcing the output of NOR gate 46 to remain at the 0 level. On the other hand, while switch 18 is in its opposite position, the ZDR signal is at the 0 level. This enables NOR gate 46 to couple to its output the complement of the signal it receives on its other input from NOR gate 47.

An AND gate 49 has two inputs, one of which is connected to receive the f2 signal and the other of which is connected to a first one 26-1 of three switch contacts of switch 26. When switch 26 is in the position shown in FIG. 4, the pole of switch 26 connects contact 26-1 to V1 thereby causing the output signal of AND gate 49 to be a copy of the f2 signal. Whenever switch 26 is in any other position, the output signal of AND gate 49 remains at the 0 level.

An AND gate 50 has two inputs, one of which is connected to a second one 26-2 of the switch contacts of switch 26, and the other input of which is connected to receive the f4 signal. An AND gate 51 has two inputs, one of which is connected to a third one 26-3 of the switch contacts of switch 26, and the other input of which is connected to receive the signal f5. It will be appreciated from the foregoing that, depending upon the position of switch 26, the output signal of NOR gate 47 is either a 100 Hz squarewave, a 1 Hz squarewave or a 1 ppm squarewave.

Figure 5:
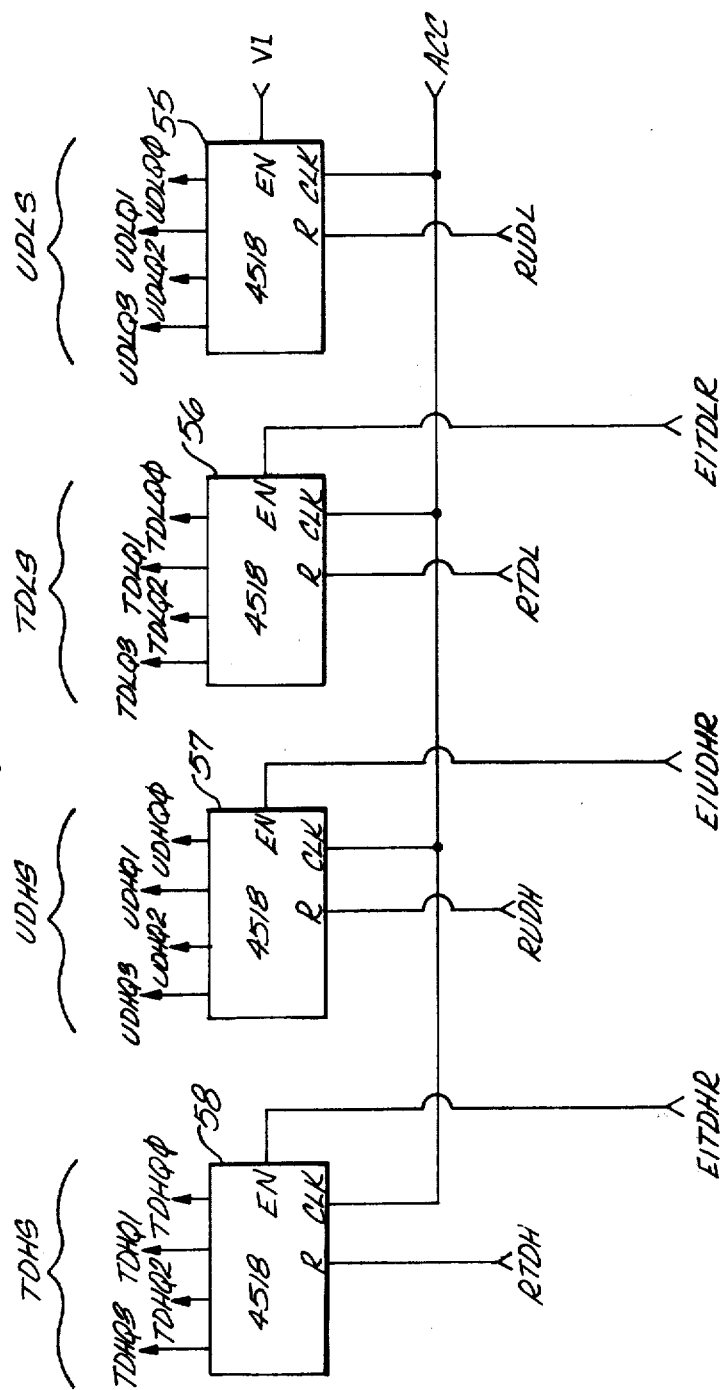

In FIG. 5, there are shown four subregisters 55, 56, 57, and 58 that cooperate under the control of sequencing circuitry shown in other figures to form the accumulator counter. A suitable integrated circuit is a CMOS 4013B series, Dual Up Counter. In the illustrated embodiment, one such Dual-Up Counter is used for subregisters 55 and 56, and another such Dual-Up Counter is used for subregisters 57 and 58. Each half of the Dual Up Counter is adapted for counting in binary coded decimal (BCD) and, except in situations in which it receives a resetting signal, it responds to a succession of positive edges applied to its clock input by cyclically counting through the BCD digits 0 through 9.

In operation, the states of subregisters 55–58 respectively define what are referred to herein as: a unit's digit, lower order; a ten's digit, lower order; a unit's digit, higher order; and a ten's digit, higher order. By way of explanation of the foregoing terminology, consider circumstances in which mode control switch 25 is in the twenty-four hour cycle mode. In this mode, a unit's digit and a ten's digit are involved in defining the minutes of the hour, the minutes being lower order than the hours. Similarly, a unit's digit and a ten's digit are involved in defining the hours of the day.

Further in this connection, consider circumstances in which mode control switch 25 is in the hour interval mode. In this mode the states of subregisters 55 and 56 correspond to the number of seconds that have elapsed within a given minute within the interval, and the states of subregisters 57 and 58 correspond to the number of minutes that have elapsed within the interval. Again, in these circumstances, there are involved lower and higher orders (seconds and minutes in this case) and unit's and ten's digits for each order.

Each of the four subregisters produces four output signals. For convenience of explanation, these signals are given names herein as follows. Each of the four signals produced by subregister 55 includes as a prefix portion of its name the achronym UDL (i.e., unit's digit, lower order). The suffixes of these names, Q0, Q1, Q2, and Q3, will be recognized by those skilled in the art as being standard designations of counting stage outputs. Collectively, these four signals are referred to as the UDLS signal. Each of the four signals produced by subregister 56 includes as a prefix portion of its name the achronym TDL (i.e., ten's digit, lower order). Again, the suffixes are standard designations of counting stage outputs. Collectively, these four signals are referred to as the TDLS signal. Each of the four signals produced by subregister 57 includes as a prefix portion of its name the achronym UDH (i.e., unit's digit, higher order). The suffixes again are standard designations of counting stage outputs. Collectively, these four signals are referred to as the UDHS signal. Each of the four signals produced by subregister 58 includes as a prefix portion of its name the achronym TDH (i.e., ten's digit, higher order). The suffixes again are standard designations of counting stage outputs.

Each of the subregisters has a clock input that is connected to receive the ACC signal. Each positive edge in the ACC signal causes subregister 55 to increment. Subregisters 56, 57, and 58, on the other hand, increment only on those positive edges of the ACC signal that occur while an input signal applied to an enable input of the respective subregister is at the 1 level. For register 56, this input signal is the EITDLR (an achronym for enable increment, ten's digit, lower order register) signal. For register 57, the signal is the EIUDHR signal, and for register 58 it is the EITDHR signal. The circuitry involved in producing these signals, and certain other signals applied to the subregisters for resetting them, is described below with reference to other figures.

Figure 6:
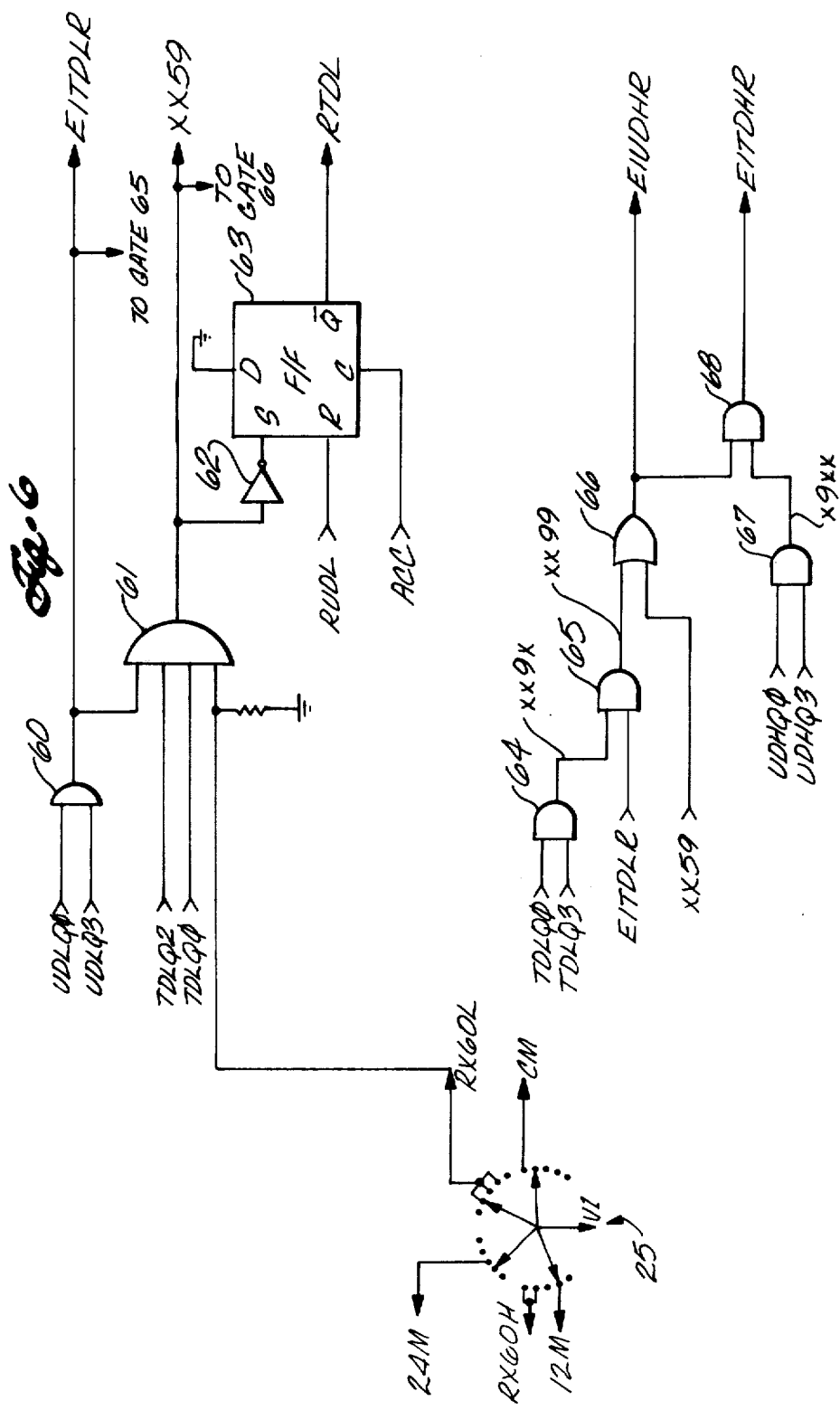

As shown in FIG. 6, an AND gate 60 receives the UDLQ0 and the UDLQ3 signals as inputs and produces the EITDLR signal. Thus, whenever the decimal value of the bits stored in subregister 55 equals 9, the EITDLR signal is at the 1 level, thereby enabling subregister 56 to respond to the next positive edge in the ACC signal and be incremented.

An AND gate 61 receives four inputs: the EITDLR signal, the TDLQ2 signal, the TDLQ0 signal, and a signal referred to herein as RX60L. The term "RX60L" is an achronym for radix 60, lower order. This signal is at the 1 level while mode control switch 25 is in a position to place control center module 2 in any one of the following three modes: twenty-four hour cycle, twelve hour cycle, and hour interval. In each of these three modes, subregisters 55 and 56 count in accordance with a radix 60 number system. That is, the subregisters recycle to decimal value 00 immediately following the decimal value 59. The signal produced by AND gate 61 is referred to as xx59. This signal is at the 1 level whenever, during any one of the three above-mentioned modes, the signals produced by subregisters 55 and 56 define the decimal number 59.

An inverter 62 produces the complement of the xx59 signal, which complement is applied to the direct set input of a D-type flip-flop 63. A suitable D-type flip-flop is one half of a dual-D flip-flop of the CMOS 4013B series. The $\overline{Q}$ output of flip-flop 63 defines an RTDL signal which, as shown in FIG. 5, is applied to the reset input of subregister 56. Flip-flop 63 is reset whenever the RUDL signal is at the 1 level. Flip-flop 63 is set by a positive edge in the ACC signal in circumstances in which the xx59 signal is at the 0 level.

As further shown in FIG. 6, the EIUDHR signal is produced by a group of gates including AND gate 64, AND gate 65, and OR gate 66. AND gate 64 provides an xx9 signal that is at the 1 level whenever the decimal value of the bits stored in subregister 56 equals 9. AND gate 65 provides an xx99 signal that is at the 1 level in circumstances in which the decimal values of the bits stored in subregisters 55 and 56 equal 99. This circumstance arises in the course of operation in either the cascade mode or the minute interval mode. In the course of operation in any of the remaining modes, which involve radix 60 counting for the lower order digits, the xx59 signal is at the 1 level in circumstances in which the decimal values of the aforesaid bits equal 59. It will be appreciated from the foregoing that the EIUDHR signal is at the 1 level in either of the aforesaid circumstances.

EITDHR signal is produced by a gating arrangement comprising tandemly connected AND gates 67 and 68. AND gate 67 provides an x9xx signal that is at the 1 level whenever the decimal value of the bits stored in subregister 57 equals 9. The EITDHR signal is at the 1 level whenever both the EIUDHR and x9xx signals are at the 1 level.

With reference to FIG. 7 there will now be described sequencing control circuitry involved in producing the RUDH signal that is used to reset subregister 57. A three-input AND gate 70 produces an HE12 (an acronym for higher order digits equal 12) signal that is at the 1 level whenever, during the 12 hour cycle mode (the signal 12M being at the 1 level), the decimal values of the bits stored in subregisters 58 and 57 equal 1 and 2, respectively. A three-input AND gate 71 produces an HE24 (an acronym for higher order digits equal 24) signal that is at the 1 level whenever, during the 24 hour cycle mode (the signal 24M being at the 1 level), the decimal values of the bits stored in subregisters 58 and 57 equal 2 and 4, respectively.

An OR gate 72 and an inverter 73 are connected in tandem to produce an IFR1 (an acronym for inhibit flip-flop reset 1) signal. The IFR1 signal is applied to the direct set input of a D-type flip-flop 74. The D input of flip-flop 74 is grounded; its direct reset input receives the RUDL signal; it is clocked by the ACC signal; and its $\overline{Q}$ output provides the RUDH signal.

Consider now the following sequence of operation. At a given point during a 12 hour cycle, the decimal values of the bits stored in the four subregisters of the accumulator counter are 1159. At such given point, the IFR1 signal is at the 1 level thereby forcing flip-flop 74 to remain in its set state. The first ensuing clock pulse defined by the ACC signal causes the accumulator counter to increment to 1200. In response, the IFR1 signal changes to the 0 level. The second ensuing such clock pulse causes flip flop 74 to enter its reset state whereby the RUDH signal changes to the 1 level. This directly causes subregister 57 to reset, and indirectly (via an OR gate 75) causes subregister 58 to reset. The second ensuing such clock pulse also causes incrementation of the accumulator counter. It will be appreciated from the foregoing that this sequence involves counting from 1159 to 1200 to 0001. By virtue of the counting to 0001, the IFR1 signal returns to the 1 level. The same kind of operation is involved during a 24 hour cycle to provide for counting from 2359 to 2400 to 0001.

With continued reference to FIG. 7, an AND gate 76 produces an HE59 (an acronym for higher order digits equal 59) signal. An inverter 77 complements this signal to produce an IFR2 (an acronym for inhibit flip-flop reset 2) signal. The IFR2 signal is applied to the direct set input of a D-type flip-flop 78. The D input of flip-flop 78 is grounded, as is its direct reset input; it is clocked by the ACC signal; and its $\overline{Q}$ output provides the RTDH signal.

Consider now the following sequence of operation. At a given point during operation in the minute interval mode, the decimal value of the bits stored in the four subregisters of the accumulator counter are 5999. This of course means that 59 full seconds and 99 hundredths of a second have elapsed during the minute interval. At such point, the HE59 signal is at the 1 level because all four input signals (TDHQ0, TDHQ2, EITDHR, and RX60H) applied to AND gate 76 are at the 1 level. The complementary signal, IFR2 is at the 0 level and accordingly is not operating to inhibit flip-flop 78 from being reset. The next ensuing clock pulse causes such resetting with the result that the RTDH signal changes to the 1 level. The same clock pulse causes incrementation so that the combined effect is a counting from 5999 to 0000. The same kind of operation is involved in the hour interval mode. In such mode, the counting proceeds from 5959 (i.e., 59 minutes and 59 seconds) to 0000.

With continued reference to FIG. 7, there will now be described circuitry involved in producing the RUDL signal. An AND gate 79 has three inputs that are connected to receive the following three signals: CM; Set Enable; and MR (an acronym for manual reset). In order for the output signal produced by AND gate 79 to be at the 1 level, the following is necessary. One, mode control switch 25 must be adjusted to the position for the cascade mode; two, switch 18 must be adjusted to the position for enabling presetting of the accumulator counter; and pushbutton switch 24 must be depressed. A NOR gate 80 and an inverter 81 are connected in tandem such that the RUDL signal is at the 1 level whenever the output signal produced by AND gate 79 is at the 1 level.

The RUDL signal is also subject to control of a switch described hereinafter with reference to module 3. The circuitry within module 2 involved in this respect includes an AND gate 82. Briefly, while the system is operating in the cascade mode, a signal (FBR) can be fed back to AND gate 82 and cause the RUDL signal to change to the 1 level.

Figure 9:
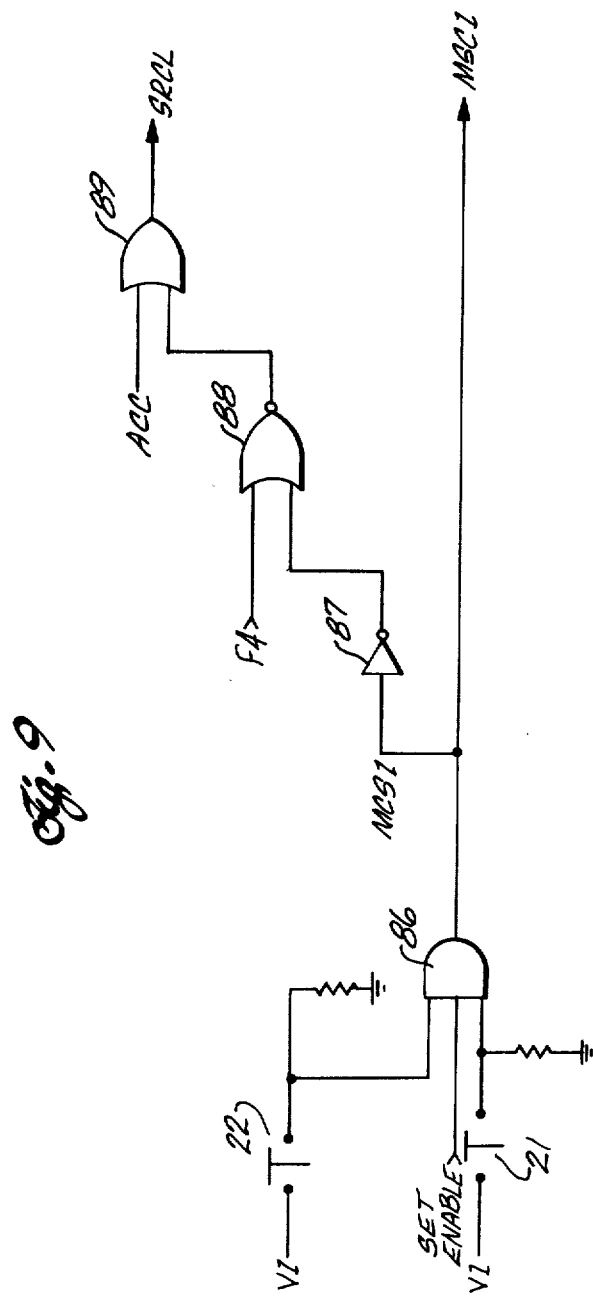

Reference is now made to FIGS. 8 and 9. In accordance with a particularly advantageous feature of the preferred embodiment of this invention, circuitry is provided within module 2 to generate a skip digit signal (SDS). The SDS signal is defined by four parallel signals, SDQ1 through SDQ4, produced by a decade counter 85 (FIG. 8). A suitable such decade counter is a CMOS 4160B series integrated circuit. Counter 85 plays different roles in the overall operation in different modes. It keeps track of the day of the week when the system is being operated in either the 24 hour mode or the 12 hour mode. On the other hand, it keeps track of the number of hours or minutes that have elapsed in the hour or minute interval modes, respectively. In broad terms, in any of the modes, it constitutes an extension of the accumulator counter.

The clocking signal for counter 85 is produced by circuitry shown in FIG. 9. An AND gate 86 has three inputs, one of which is connected to pushbutton switch 22, another of which is connected to pushbutton switch 21, and the remaining one of which is connected to receive the Set Enable signal. When both pushbuttons are depressed while the Set Enable signal is at the 1 level, the output signal, MSC1, of AND gate 86 is at the 1 level. An inverter 87, a NOR gate 88, and an OR 89 are connected as shown in FIG. 9 such that the SRCL signal is the complement of the f4 signal while the MCS1 signal is at the 1 level. Otherwise, the SRCL signal is a copy of the ACC signal.

Register 85 (FIG. 8) has two count enable inputs (TE and PE) that are each connected to the output of an inverter 90. The input of inverter 90 is connected to the output of NOR gate 91. Thus, whenever the output signal produced by NOR gate 91 is at the 0 level, counter 85 is enabled to respond to positive edges in the SRCL signal by incrementing.

One of the circumstances in which such enabling occurs involves the 24 hour cycle mode. In particular, an AND gate 92 and an AND gate 93 are so connected as to provide such enabling when the accumulator counter defines 2359. Thus, the next two ensuing clock pulses cause the accumulator counter to change to 2400, then to 0001, this being the first minute of a new day, and in the course thereof, counter 85 is incremented so as to keep track of the day of the week.

Another such circumstance involves the hour interval and minute interval modes. In either of these modes, as discussed above with reference to FIG. 7, the HE59 signal is at the 1 level when the accumulator counter is full (i.e., either 5959 in the hour interval mode or 5999 in the minute interval mode). Thus, the next ensuing clock pulse affects both the accumulator counter and decade counter 85.

Another such circumstances involves the 12 hour mode. in particular, an AND gate 94, an AND gate 95, a D-type flip-flop 96, and an AND gate 97 are so connected as to provide such enabling incident to the cycling of the accumulator counter from one 12 hour portion of the day to the next 12 hour portion.

AND gate 94 produces a 1159 signal in response to the following four input signals: TDHQ0, UDHQ0, EIUDHR, and 12M. After the 1159 signal changes to the 1 level, AND gate 97 gates the next ensuing clock pulse to the clock input of flip-flop 96 whose state corresponds to morning (AM) or afternoon (PM).

The sequential incrementation of counter 85 is such that it provides for keeping track of the day of the week in accordance with a code whereby decimal 1 corresponds to Sunday, decimal 2 to Monday, etc. In the illustrated embodiment, an AND gate 98 and an inverter 99 are connected as shown to provide a control signal to the LOAD input of counter 85 to cause recycling from decimal 7 to decimal 1.

Reference is now made to FIG. 10 which shows the details of connector 4 and the circuitry within module 2 that is connected thereto. A portion of such circuitry involves state decoding circuitry comprising four BCD-to-Decimal decoders 101, 102, 103, and 104. Suitably, each of these four BCD decoders is a CMOS 4028B series, BCD to decimal decoder.

BCD decoder 101 decodes the state of subregister 58 (FIG. 5), and, to that end, receives as inputs the TDHQ3, TDHQ2, TDHQ1, and TDHQ0 signals, these collectively constituting the TDHS signal. BCD decoder 101 has ten outputs that are connected to common bus wires CB1 through CB10. These wires carry ten of a plurality of parallel pulse signals that in combination define a timing interval divided into a sequence of time slots. These ten pulse signals, referred to herein as PSTH0 (an acronym for pulse signal ten's of hours) through PSTH9, define a 1 out of 10 code. That is, at any given point in time, one of these ten pulse signals is at the 1 level whereas the remaining ones are each at the 0 level.

BCD decoder 102 decodes the state of subregister 57 (FIG. 5), and, to that end, receives as inputs the four signals that collectively constitute the UDHS signal. BCD decoder 103 decodes the state of subregister 56 (FIG. 5), and, to that end, receives as inputs the four signals that collectively constitute the TDLS signal. BCD decoder 104 decodes the state of subregister 55 (FIG. 5), and, to that end, receives as inputs the four signals that collectively constitute the UDLS signal. Like BCD decoder 101, each of the BCD decoders 102, 103, and 104 applies ten parallel pulse signals to respective wires of the common bus. The ten signals so applied by BCD decoder 102 are referred to as PSUH0 through PSUH9. The ten signals so applied by BCD decoder 103 are referred to as PSTM0 through PSTM9. The ten signals so applied by BCD decoder 104 are referred to as PSUM0 through PSUM9. In summary of the foregoing, the four state decoding decoders for the accumulator counter apply 40 parallel pulse signals to common bus wires CB1 through CB40.

An exemplary condition of the above-described 40 parallel pulse signals is as follows. When the decimal values of the bits stored in the accumulator counter are 1159, the following four pulse signals are at the 1 level: PSTH1, PSUH1, PSTM5, and PSUM9. Each of the remaining 36 above-described pulse signals is at the 0 level. The next ensuing clock pulse causes, in the 24 hour cycle mode for example, the accumulator counter to increment to 1200. This state is decoded such that the following four pulse signals are at the 1 level: PSTH1 PSUH2, PSTM0, and PSUM0. Each of the remaining 36 above-described pulse signals is at the 0 level.

Another BCD decoder 105 is provided for decoding the state of counter 85 (FIG. 8), and, to that end, it receives as inputs the four signals that collectively constitute the SDS signal. BCD decoder 105 has seven outputs that are connected to common bus wires 41-47. These seven wires carry seven signals referred to herein as PSSD1 through PSSD7. In either the 24 hour cycle mode or the 12 hour cycle mode, these seven signals are coded to identify the day of the week. Appropriately, Sunday is day number 1, and Saturday is day number 7. Thus, on Sunday, the signal PSSD1 is at the 1 level and each of the signals PSSD2 through PSSD7 is at the 0 level.

In the illustrated embodiment, the common bus further includes wires CB48 through CB54 which carry the following signals: AMP (an acronym for AM prime); PMP (an acronym for PM prime); FBR (an acronym for feedback reset); CM; ZFI (an acronym for zero for inhibit); MSTR (an acronym for master reset); and 12MP (an acronym for 12 hour mode prime). Inverters 106, 107, and 108 respectively complement the 12M, AM, and PM signals described above with reference to FIGS. 6 and 8 to produce the prime signals. A two-input NOR gate 109 produces the MSTR signal. One of its inputs is connected to receive the Set Enable signal produced by switch 18 (FIG. 4). Its other input is connected to pushbutton switch 23.

Figure 11:
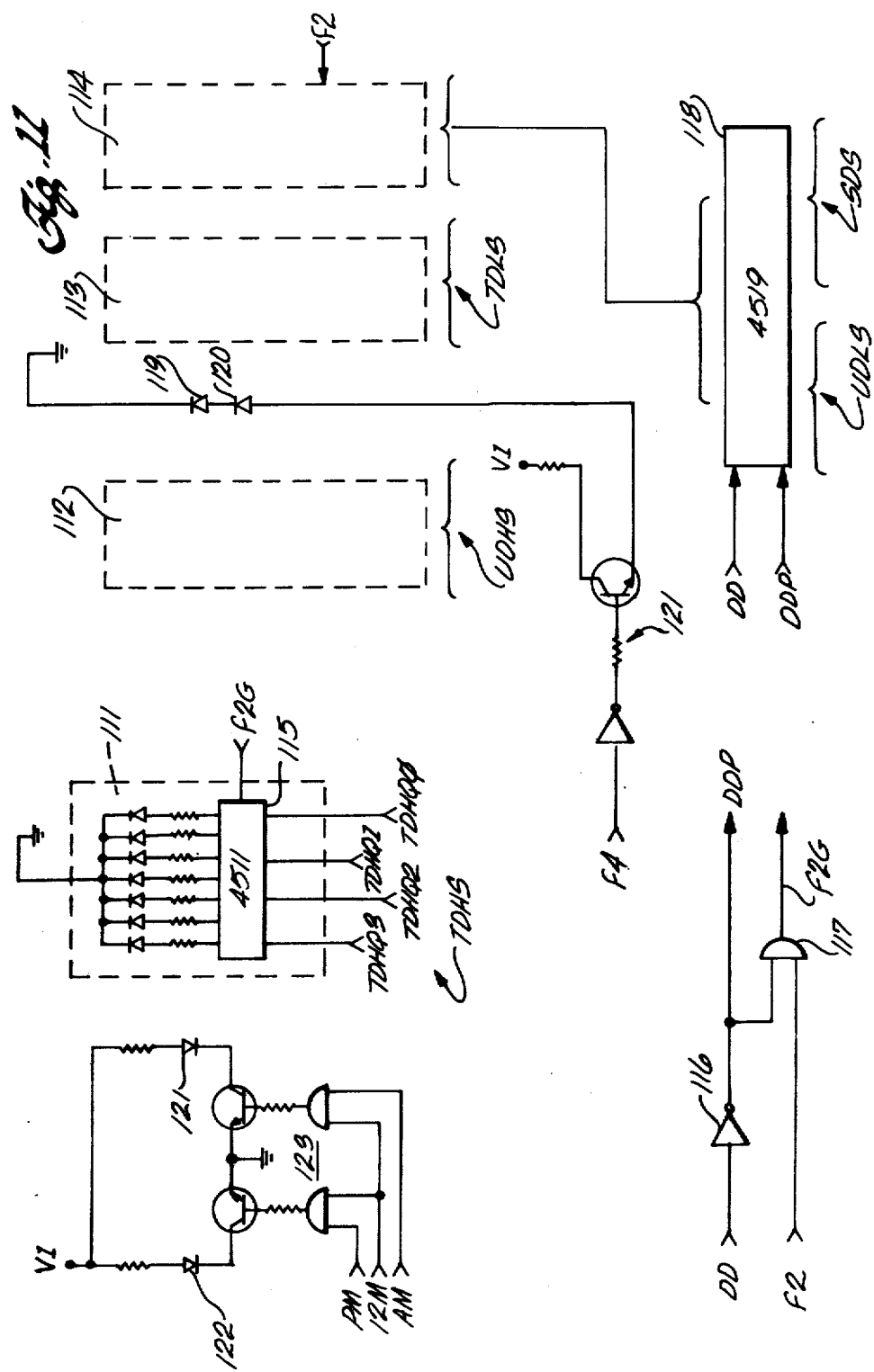

Reference is now made to FIG. 11 which shows the details of circuitry involved in controlling display 7 (FIG. 1). In FIG. 11, there is shown in detail a circuit arrangement 111. Three other circuit arrangements 112, 113, and 114 are internally identical to circuit arrangement 111, and accordingly the internal details of circuit arrangement 111 only is shown in FIG. 11. Within each of these circuit arrangements, as shown particularly in circuit arrangement 111, there is a BCD-to-Seven Segment Driver 115. A suitable such driver is a CMOS 4511B series integrated circuit.

Driver 115 in circuit arrangement 111 receives as inputs the four signals that collectively constitute the TDHS signal. It has seven outputs for selectively energizing appropriate light emitting diodes (LED's) which are arranged in a matrix to display a digit. Driver 115 has a blanking input that receives a signal referred to as the f2G signal.

The f2G signal is produced by a gating circuit comprising an inverter 116 and an AND gate 117. Inverter 116 receives as its input the DD (an acronym for display day) signal developed at switch 21 (FIG. 9), and produces the DDP signal. AND gate 117 receives the DDP signal and the f2 signals as inputs, and produces the f2G signal. Accordingly, f2G is either a copy of f2 (while pushbutton switch 21 is not being depressed) or remains at the 0 level (while pushbutton switch 21 is being depressed). It will be recalled that in the illustrated embodiment, the frequency of f2 is 100 Hz. Thus, driver 115 is turned on and off at a 100 Hz rate while it is driving LED's for the ten's digit of the hour portion of display 7 (FIG. 1). While display 7 is being used to display the day of the week, driver 115 is turned off.

Circuit arrangements 112 and 113 perform the identical function as circuit arrangement 111 for the unit's digit of the hour and the ten's digit of the minutes respectively. And, each is turned off while the day of the week is being displayed.

Circuit arrangement 114 performs either the function of displaying the unit's digit of the minutes, or the function of displaying the day of the week. It receives as inputs, f2 (for the blanking input of its internal driver, not shown) and the output signal provided by a selector circuit 118. A suitable such selector circuit is a CMOS 4519B series, data selector.

The output of selector 118 is either a copy of the UDLS signal or a copy of the SDS signal, depending upon the levels of the DD and DDP signals.

Display 7 further includes a pair of LED's 119 and 120 that are so positioned on panel 8 as to look like a colon separating the hour's digits from the minute's digits. A conventional circuit generally indicated at 121 receives f4 (a 1 Hz square wave) and, in response, drives LED's 119 and 120 on and off.

Another pair of LED's 121 and 122 are provided for indicating whether it is morning or afternoon. The conventional driver circuitry generally indicated at 123 controls LED's 121 and 122 in accordance with the AM, PM, and 12M signals.

Figure 13:
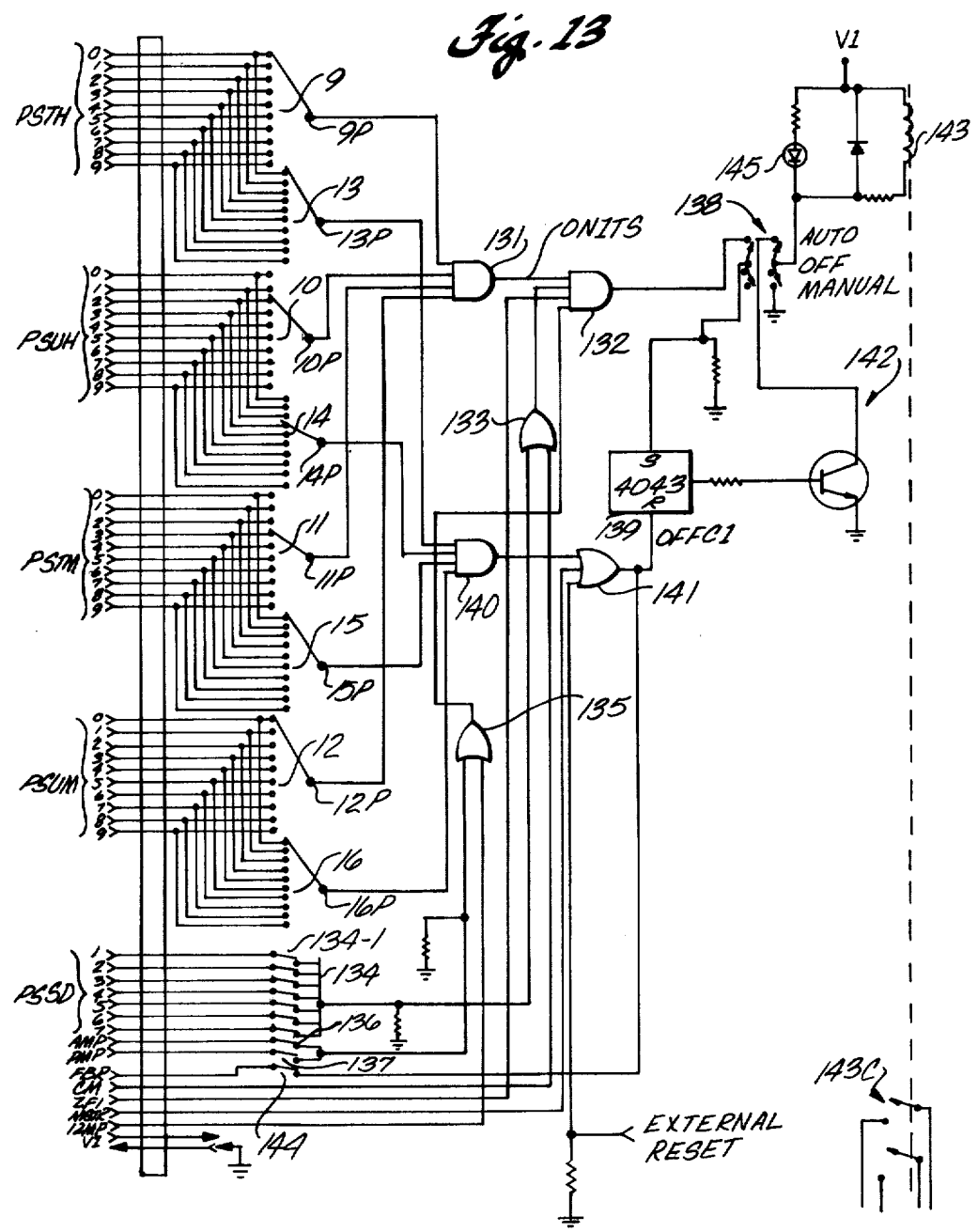
FIG. 13 is a block and schematic diagram depicting decoder circuitry within an individual decoder module.

Reference is now made to FIG. 13, which depicts decoder circuitry within decoder module 3. In the illustrated embodiment, decoder module 3 includes six independently operable decoders that are organized into three groups, D1, D2, and D3, each such group including an ON-command decoder and an OFF-command decoder. Each pair of ON-command decoder and OFF-command decoder is identical in construction and operation. Accordingly, only one such pair, D1, is shown and described in detail herein.

As shown in FIG. 13, the ON-command decoder D1ON, comprises a gating means operable to produce a signal referred to herein as ONC1 (an acronym for ON command 1), and further comprises manually adjustable means, viz., thumbwheel switches 9, 10, 11, and 12, for completing a plurality of signal flow paths from the common bus to the associated gating means to cause the ONC1 signal to be at the 1 level during a selected time slot. Similarly, the OFF-command decoder D1OFF comprises gating means operable to produce a signal referred to herein as OFFC1, and further comprises manually adjustable means, viz., thumbwheel switches 13, 14, 15, and 16, for completing a plurality of signal flow paths from the common bus to the associated gating means to cause the OFFC1 signal to be at the 1 level during a selected time slot.

An AND gate 131 has four inputs that are respectively connected to the four poles 9P, 10P, 11P, and 12P of switches 9-12. AND gate 131 produces a signal referred to herein as ON1TS (an acronym for ON 1 time slot). The ON1TS signal is at the 1 level during a manually selected time slot. For example, with switches 9-12 being adjusted to be in the positions illustrated in FIG. 13, the selected time slot is coextensive with the time that the accumulator counter defines the digits 0230.

The ON1TS signal and three other signals are applied to the inputs of an AND gate 132. The three other signals are the ZFI signal, a signal referred to as SFPC (an acronym for Skip flow path complete), and a signal referred to as 12FPC (an acronym for 12 hour flow path complete).

The SFPC signal is provided by an OR gate 133. One of the input signals applied to OR gate 133 is the CM signal. Therefore, whenever the system is being operated in the cascade mode, the SFPC signal is at the 1 level. The other input signal for OR gate 133 is received from the junction of seven contacts of seven single-pole, single-throw (SPST) skip switches 134-1 through 134-7. These switches are also shown in FIG. 1 in the lower left hand corner area of the front panel of module 3. Switch 134-1 propagates, when closed, the PSSD1 signal to OR gate 133. By turning this switch off, the PSSD1 does not so propagate, with the result that the output signal produced by AND gate 132 will not change to the 1 level even when the skip digit signal SDS defines the digit 1. One of the advantages of this feature is that the user can control whether an ON command signal will be produced on a particular day. The remaining SPST switches 134-2 through 134-7 perform the same kind of function.

The ZFI signal is applied to AND gate 132 so as to inhibit production of an ON command in circumstances in which the accumulator clock is being preset and also in circumstances in which the user is depressing the master reset switch 23.

The 12FPC signal is applied to AND gate 132 so as to perform a skipping function similar to that described above. In particular, the 12FPC signal is provided by an OR gate 135. One of the input signals for OR gate 135 is the 12MP signal. Accordingly, while the system is being operated in any of the four modes other than the 12 hour cycle mode, the 12FPC signal is at the 1 level. While it is being operated in the 12 hour cycle mode, the value of the 12FPC signal is controlled by two SPST switches 136 and 137. A switch 138 provides for manually controlling whether the output signal provided by AND gate 131 is to be applied to a latch circuit 139. A suitable latch circuit is one-quarter of a quad latch, CMOS 4043B series integrated circuit.

The gating means involved in OFF-command decoder DIOFF comprises an AND gate 140 that has four inputs which are respectively connected to poles 13P, 14P, 15P, and 16P of switches 13 through 16. The output signal, OFF1TS, provided by AND gate 140 is applied to one of the inputs of a three input OR gate 141. The other two inputs are connected to receive the MSTR signal and an external reset signal. The output of OR gate 141 is connected to the reset input of latch circuit 139.

The output of latch circuit 139 is connected to the input of a transistor driver circuit 142 that is switchably connected to a relay coil 143. The relay contacts 143-C can be used for switching power to an external device such as a pool pump or the like.

A switch 144 is provided for selectively connecting the output of OR gate 141 to an input of AND gate 82 (FIG. 7). The signal involved here is referred to as the FBR signal.

An LED 145 is connected in a circuit path in parallel with relay coil 143 so as to provide a visual indication as to whether the externally controlled device is receiving power.

Figure 12:
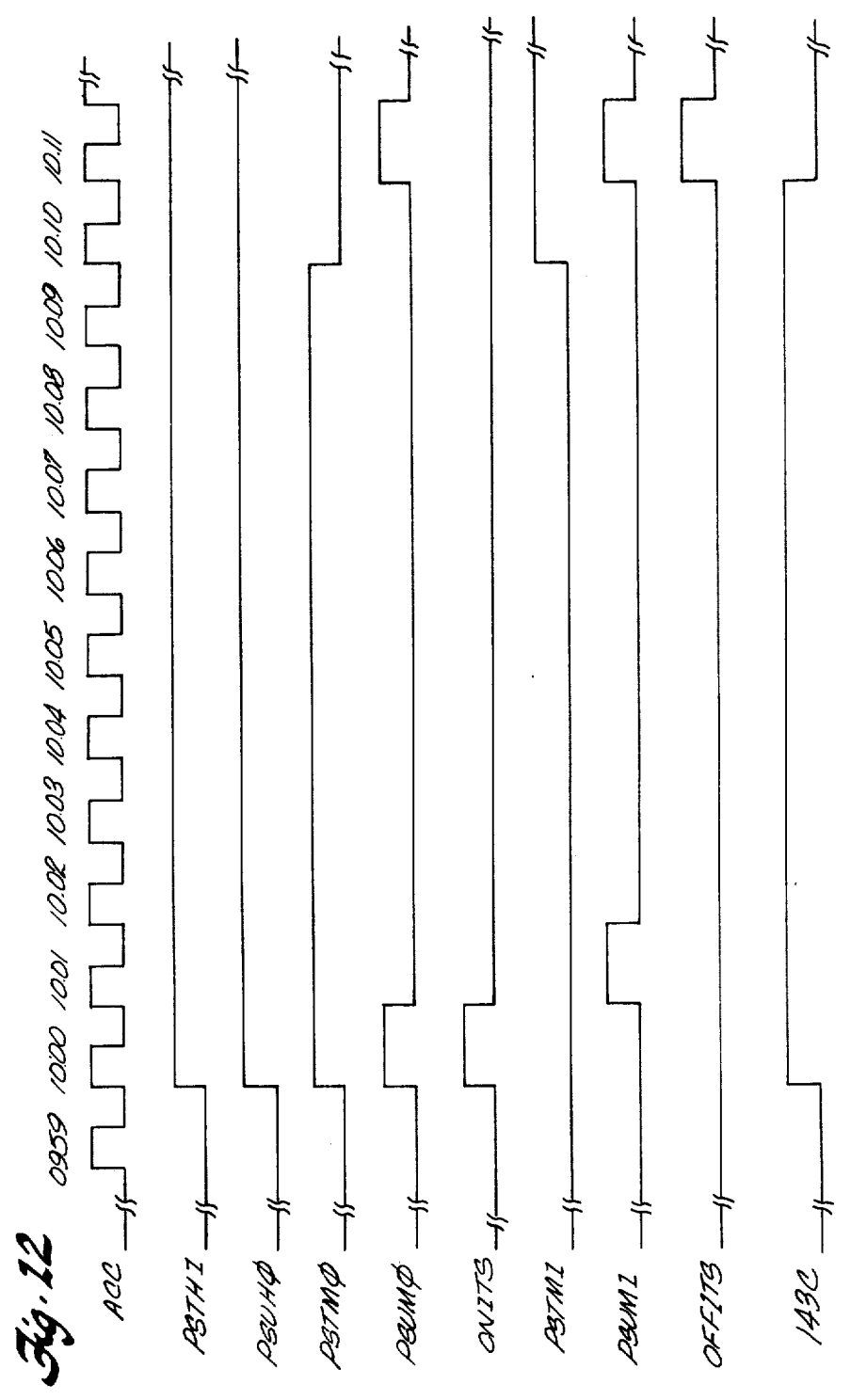

With reference to FIG. 12, there will now be described a representative example of an operation in which modular electronic timer 1 is used to turn on an off an external device at desired points in time. In this example, the external device is to be turned on at 10:00 AM and turned off at 10:11 AM.

The conditions of the various switches on the front panels, in this example, are as follows. Switch 17 is in the ON position to apply operating power to the internal circuitry. Switch 18 is in the RUN position to provide for automatic incrementation of the accumulator counter. Switches 19–24, each being a pushbutton type switch provided for initiation of functions not involved in this example, are not depressed. Mode control switch 25 is in the position for the 12 hour cycle mode. Switch 26 is in the position to select 1 ppm as the clocking rate. Switch 138 is in the auto position. Switches 9–12 are in the positions for selecting 10:00 as the on-command start time. Switches 13–16 are in the positions for selecting 10:11 as the off-command start time. Each of the SPST switches 134 is closed. SPST switch 136 is open and SPST switch 137 is closed so as to select morning but not afternoon for programmed operation of the external device.

As indicated at the left of FIG. 12, at 9:59 AM, the parallel pulse signals PSTH1, PSUH0, PSTM0, and PSUM0 are each at the 0 level. Upon incrementation of the accumulator counter by the next ensuing clock pulse, each of these four signals changes to the 1 level. Accordingly, the ON1TS signal, produced by AND gate 131 of decoder DION, changes to the 1 level. Furthermore, latch circuit 139 is set and transistor driver circuit 142 energizes relay coil 143. The contacts 143C thereby close at 10:00 AM and remain closed so long as latch circuit 139 remains set.

At 10:10 AM, the parallel pulse signals PSTH1, PSUH0, PSTM1 each is at the 1 level, and PSUH1 is at the 0 level. Upon incrementation of the accumulator counter by the next ensuing clock pulse, the PSUH1 signal changes to the 1 level with the result that AND gate 140 responds by causing the OFF1TS signal to change to the 1 level. This results in resetting of latch circuit 139 and de-energization of relay coil 143. Thus, at 10:11 AM, the external device is turned off.

Figure 14:
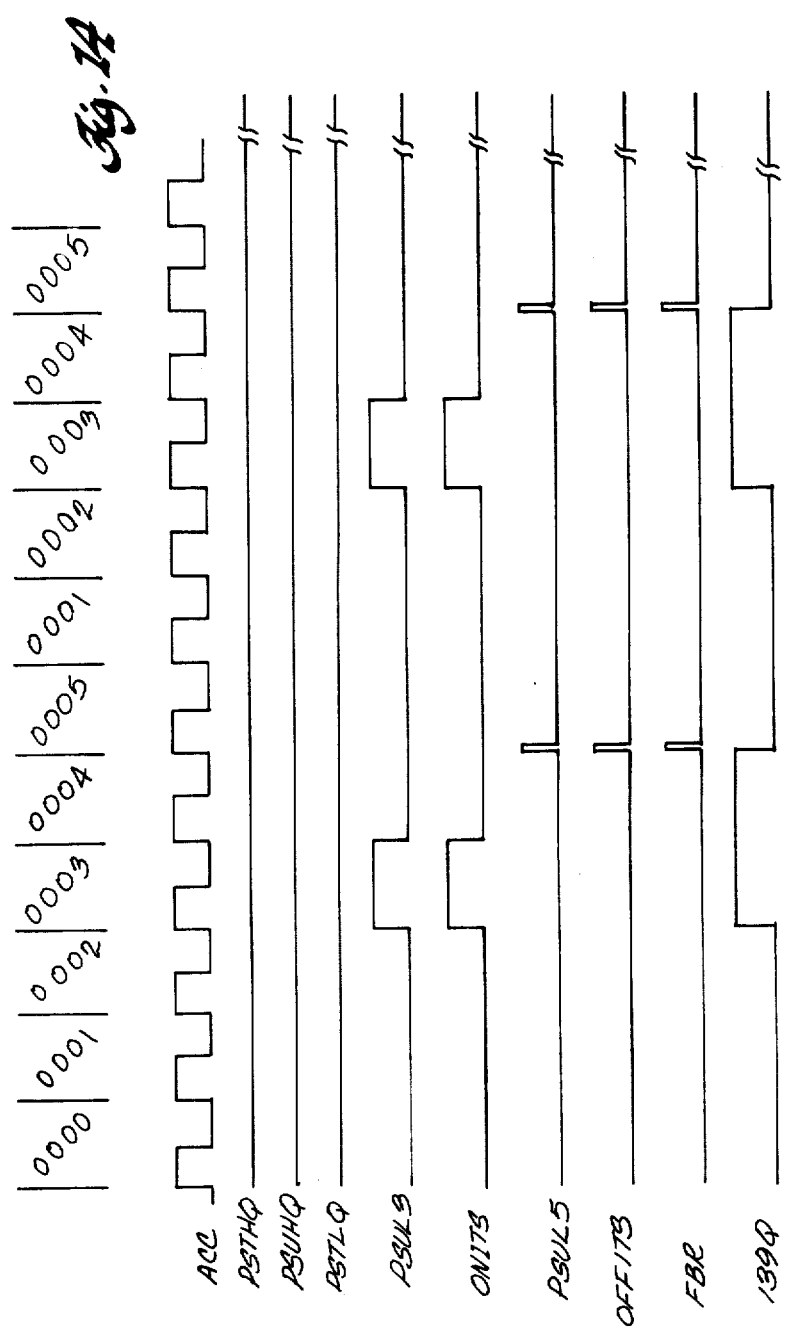
FIG. 14 is a timing diagram illustrating an example of operation involving generating a pulse train.

With reference to FIG. 14, there will now be described a representative example of an operation in the cascade mode. In this example, modular electronic timer 1 is used to generate a pulse train having a manually selected pulse repetition frequency (prf) and a manually selected pulse width. The manually selected prf is 20 Hz and the manually selected pulse width is 20 milliseconds (ms.) in this example.

The conditions of the various switches on the front panels, in this example, are the same as has been described in the first example, except as follows. Mode control switch 25 is in the position for the cascade mode. Switch 26 is in the position to select 100 Hz as the clock rate. Switches 9–12 are in the positions to select 0003 as the on-command start time. Switches 13–16 are in the positions to select 0005 as the off-command start time. Switch 144 is closed to provide for feeding back a resetting signal.

As indicated at the left of FIG. 14, the parallel pulse signals PSTH0, PSUH0, and PSTM0 each is at the 1 level, and PSUL3 is at the 0 level during the 100 ms. time slot that the accumulator counter is at 0000. This remains the case until a subsequent clock pulse causes the accumulator counter to increment to 0003. At that point, the PSUL3 signal changes to the 1 level, and in response the leading edge of the pulse (available at the output of latch circuit 139) occurs. A clock pulse occurring 20 ms. thereafter causes the accumulator counter to increment to 0005. At that point, the PSUL5 signal changes to the 1 level, and in response the trailing edge of the pulse occurs. Simultaneously, the FBR signal changes to the 1 level and causes the accumulator counter to be reset. The foregoing sequence occurs repetitiously so as to result in generation of the desired pulse train.

It will be appreciated from the foregoing representative examples of operation that modular electronic timer 1 is extremely versatile even when only one decoder module 3 is included, and that the ease with which additional such decoder modules can be included enhances its versatility. This advantage grows out of the basic organization involving independently operable decoders. It should be noted in this connection that an advantage arises from the provision of a separate control switch 138 for each decoder pair. For example, any given pair of decoders that are allocated by the user for controlling an external device on an ongoing basis can be temporarily disabled while another pair is being used in connection with some special use as in the cascade mode. The ease with which the accumulator counter can be preset is also advantageous in this connection. To set time of day, the user turns switch 18 to the Set Enable position and depresses pushbutton 17 while observing display 7. During this time, the clock pulses occur at a high rate, thereby minimizing the time required to bring the count close to the desired count. Then, the user depresses switch 20 to lower the prf of the clock pulses until the desired count is reached. Then, switch 18 is placed in the Run position for automatic operation.

The skip switches 134-1 through 134-7 are a particularly advantageously feature of the preferred embodiment. By selectively positioning them, a large number of permutations are possible. As an example of the way they can be used, a user may go on vacation and want to have lights turn on and off in his house while he is away. Potential burglars are of course aware that homeowners use equipment for performing this function, which equipment operates on a predictable basis. By having some lights turn on and off on some evenings and not others, an advantage arises with respect to confusing such potential burglars.

It will be further appreciated with the specifically described embodiment in exemplary of embodiments of this invention, and that various modifications thereto are within the scope of this invention. By way of examples of such modifications: the common bus can carry signals that are encoded in BCD format rather than the 1 out of N format described above. In such case, the decimal switches 9-16 would be replaced by binary switches and associated conventional gating circuitry; a solid state switching circuit involving a triac can be used instead of a relay for switching power to an external device; and, the single-pole, multiposition switches for completing flow paths from the common bus to gating circuitry can be replaced by an arrangement like that used for performing the skip function.

What is claimed is:

1. A modular electronic timer comprising:
a common bus;
circuit means for generating and applying to the common bus a plurality of parallel pulse signals that in combination define a timing interval divided into a sequence of time slots;
a plurality of independently operable decoders connected to the common bus so that all the decoders continuously monitor the parallel pulse signals; and
each of the independently operable decoders including gating means operable to produce an output command signal, and manually adjustable means for completing a plurality of signal flow paths from the common bus to the gating means to cause the gating means to produce the output command signal during a selected one of the time slots.

2. A timer in accordance with claim 1, wherein the circuit means includes register means for storing a multi-bit digital signal that can instantaneously define any one of a multiplicity of values, control means for controlling the register means to cause the instantaneous value of the multi-bit digital signal to vary cyclically with time, and gating means responsive to the multi-bit digital signal for forming the parallel pulse signals.

3. A timer in accordance with claim 2, wherein the control means includes manually adjustable control means for providing clocking signals to the register means at a frequency determined by the adjustment of the manually adjustable control means.

4. A timer in accordance with claim 2, and further including manually adjustable means for supplying an inhibiting signal; at least one of the independently operable decoders having its gating means connected to receive the inhibiting signal to provide for effecting a skip function whereby during at least one selected one of the cycles defined by the multi-bit digital signal the inhibiting signal inhibits the production of the output command signal.

5. A timer in accordance with claim 1, and further including a display for providing a visual indication of a time-slot identifying number.

6. A timer in accordance with claim 1, and further including a register operable to respond to the circuit means to count on a weekly cycle; and means responsive to said register for selectively controlling said gating means such that on manually selected skip days an output command signal is not produced.

7. A timer in accordance with claim 6, and further including a display and means operable to respond to said register to cause the display to provide a visual indication of the state of said register.

8. A timer in accordance with claim 1, and further comprising manually adjustable means for feeding back a command signal from an independently operable decoder to the circuit means to cause the timing means to terminate one timing interval and start another timing interval.

9. A timer in accordance with claim 1, and further comprising a first module housing for the circuit means, a second module housing for the independently operable decoders, connector means for connecting the first and second module housings together, said connector means including a plurality of electrical connections for the common bus, and the second module having connector means to which an additional such second module can be connected for expanding the number of output command signals which the timer can produce.

10. A timer in accordance with claim 9, and further comprising mode control switching means in the first module, the mode control switching means being manually adjustable to place the timer in a selected one of a plurality of modes, and wherein the circuit means includes an accumulator counter adapted to count in accordance with different radix systems in the different modes.

* * * * *